United States Patent [19]

Candor

[11] 3,966,575
[45] *June 29, 1976

[54] METHOD FOR REMOVING LIQUID FROM BEARING MATERIAL

[76] Inventor: James T. Candor, 5440 Cynthia Lane, Dayton, Ohio 45429

[ * ] Notice: The portion of the term of this patent subsequent to Nov. 19, 1991, has been disclaimed.

[22] Filed: Apr. 21, 1975

[21] Appl. No.: 569,815

Related U.S. Application Data

[60] Continuation-in-part of Ser. No. 499,178, Aug. 21, 1974, and a continuation-in-part of Ser. No. 548,666, Feb. 10, 1975, which is a continuation-in-part of Ser. No. 383,255, July 27, 1973, Pat. No. 3,849,275, which is a division of Ser. No. 263,605, June 16, 1972, Pat. No. 3,795,605, which is a continuation-in-part of Ser. No. 53,402, July 9, 1970, abandoned, which is a continuation-in-part of Ser. No. 25,938, April 6, 1970, Pat. No. 3,687,834, which is a continuation-in-part of Ser. No. 864,851, Oct. 8, 1969, abandoned, which is a continuation-in-part of Ser. No. 811,421, March 28, 1969, abandoned, said Ser. No. 548,666, is a continuation-in-part of Ser. Nos. 469,820, May 14, 1974, and Ser. No. 405,023, Oct. 10, 1973, and Ser. No. 499,178, Aug. 21, 1974.

[52] U.S. Cl. .................. 204/180 R; 204/186; 204/299 R
[51] Int. Cl.² .................................. B01D 13/02
[58] Field of Search ............... 204/180 R, 186, 299

[56] References Cited
UNITED STATES PATENTS
3,849,275   11/1974   Candor ........................ 204/180 R

*Primary Examiner*—John H. Mack
*Assistant Examiner*—A. C. Prescott
*Attorney, Agent, or Firm*—Candor, Candor & Tassone

[57] ABSTRACT

Method for moving moisture in moisture bearing material by disposing the material in an electrostatic field comprising a plurality of non-uniform electrostatic fields with each field having the higher intensity portion thereof substantially oppositely located relative to the higher intensity portion of an adjacent non-uniform field and at least partially extending across the material to act on at least part of the moisture thereof to move at least part of the moisture relative to the material.

10 Claims, 30 Drawing Figures

U.S. Patent June 29, 1976 Sheet 1 of 5 3,966,575
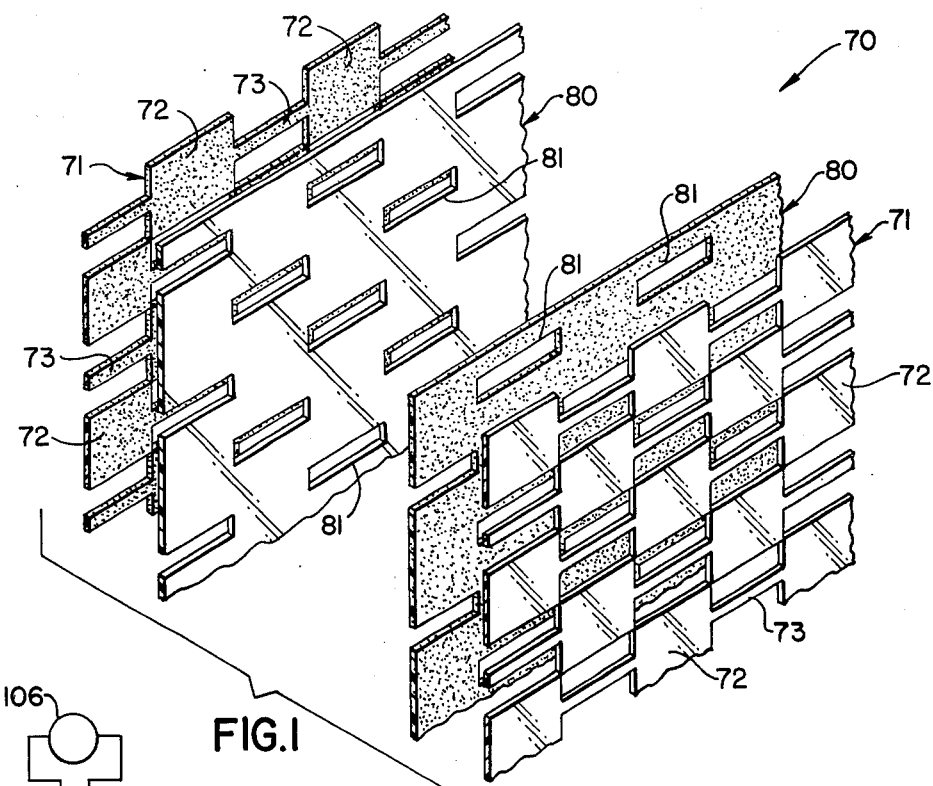
FIG.1
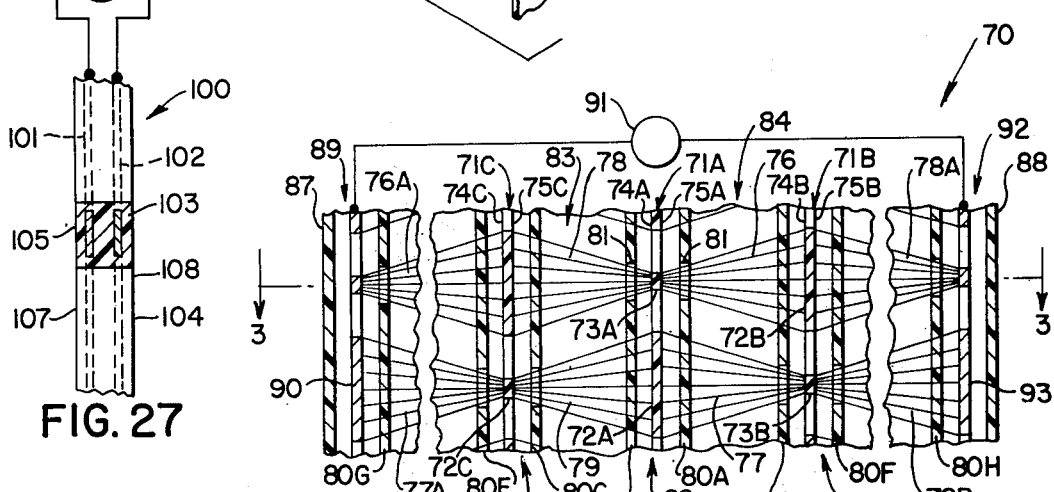
FIG. 27
FIG. 2
FIG. 3

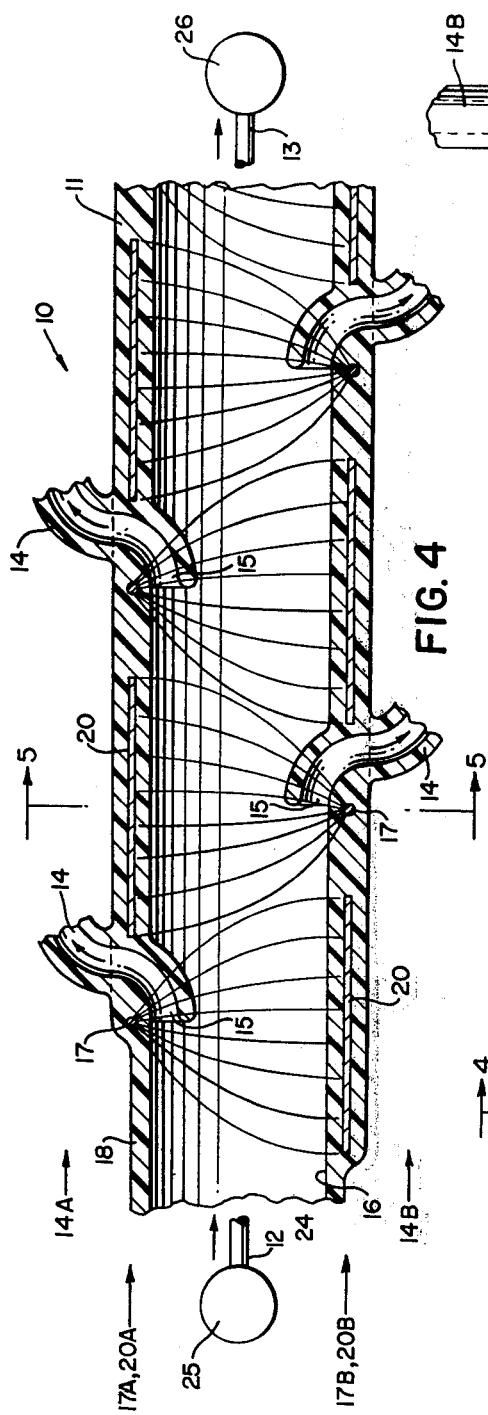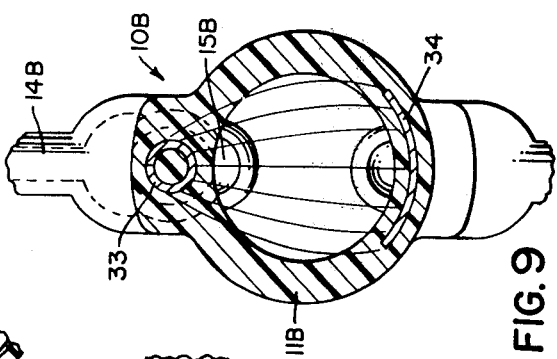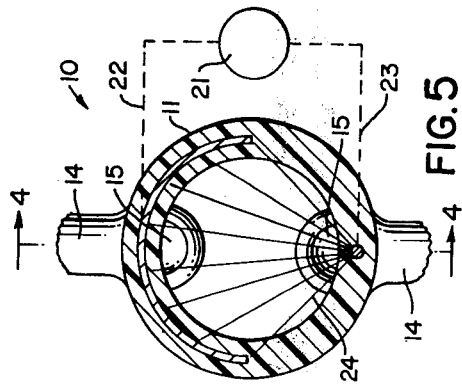

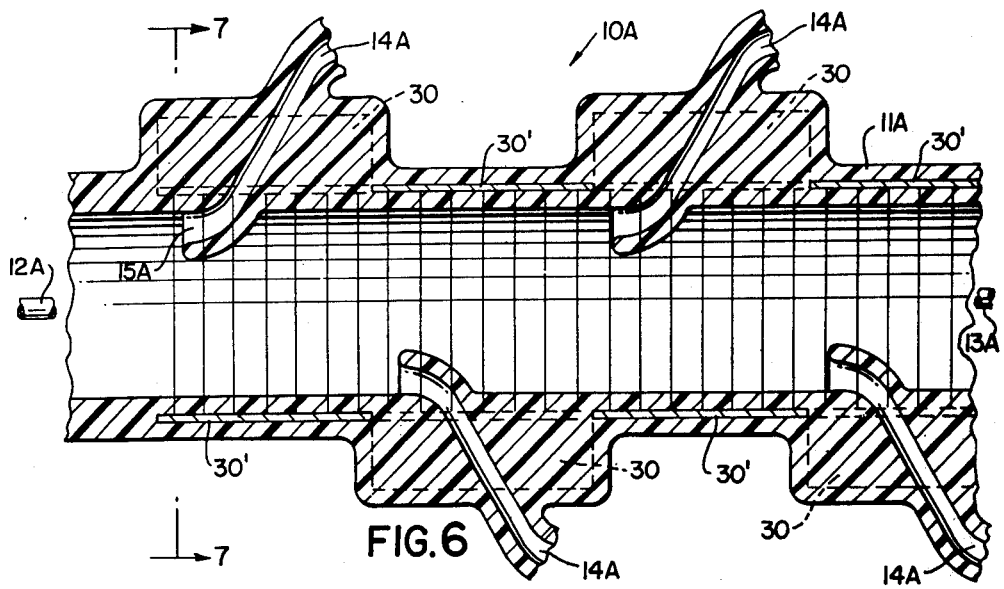
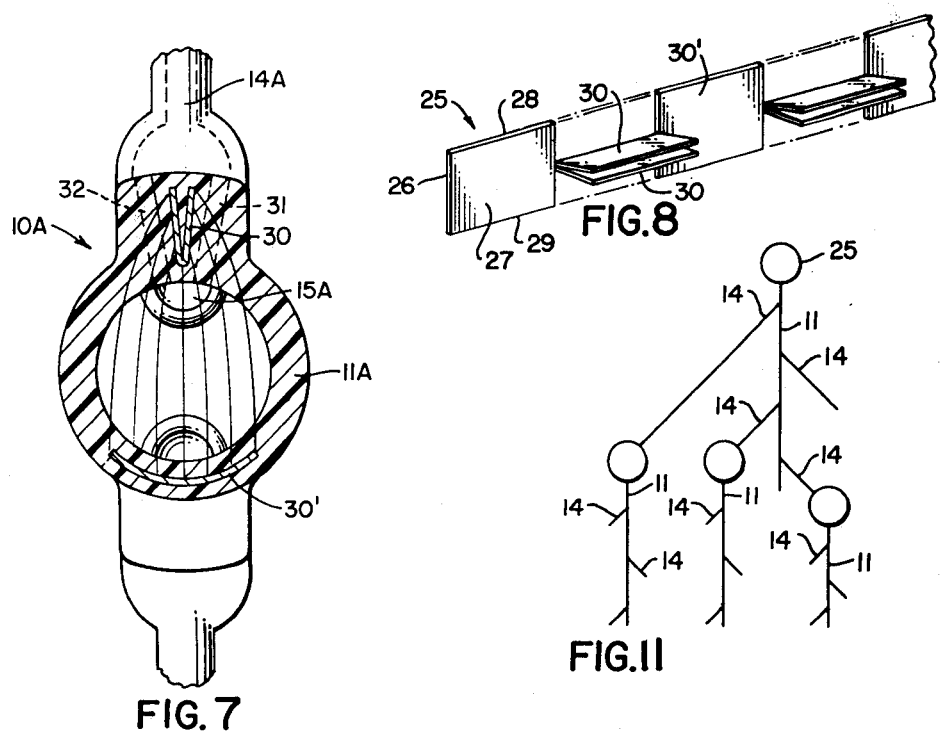

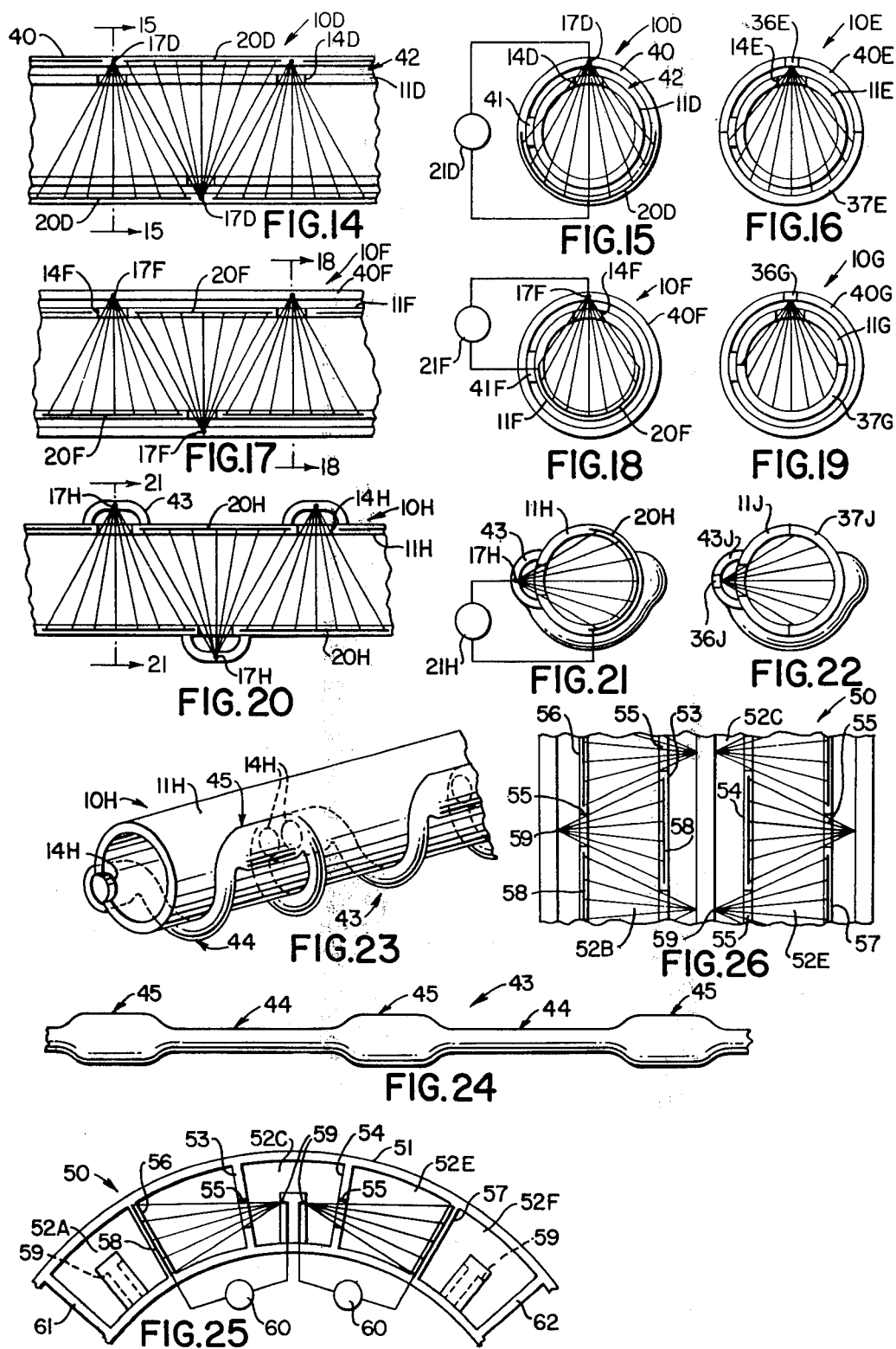

METHOD FOR REMOVING LIQUID FROM BEARING MATERIAL

This application is a continuation-in-part application of its copending parent application, Ser. No. 499,178, filed Aug. 21, 1974, which, in turn, is a continuation-in-part application of its copending parent patent application, Ser. No. 383,255, filed July 27, 1973, now U.S. Pat. No. 3,849,275, which, in turn, is a divisional application of its copending parent patent application, Ser. No. 263,605, filed June 16, 1972, now U.S. Pat. No. 3,795,605, which, in turn, is a continuation-in-part application of its copending parent patent application, Ser. No. 53,402 filed July 9, 1970, abandoned in favor of this application and which, in turn, is a continuation-in-part patent application of its copending parent patent application, Ser. No. 25,938, now U.S. Pat. No. 3,687,834, filed Apr. 6, 1970, which, in turn is a continuation-in-part of its copending parent patent application, Ser. No. 864,851, filed Oct. 8, 1969, now abandoned, which, in turn, is a continuation-in-part patent application of its copending parent patent application, Ser. No. 811,421, filed Mar. 28, 1969, and now abandoned.

This application is also a continuation-in-part application of its copending parent application, Ser. No. 548,666, filed Feb. 10, 1975, which in turn, is a continuation-in-part application of its copending parent application, Ser. No. 469,820, filed May 14, 1974, as well as a continuation-in-part application of copending Ser. No. 405,023, filed, Oct. 10, 1973, and Ser. No. 499,178, filed Aug. 21, 1974.

Thus, this application is basically a combining of the above-mentioned related patent applications, Ser. Nos. 499,178 and 548,666, together with further description pointing out that the various embodiments of the alternately arranged non-uniform electrostatic fields in Ser. No. 499,178 could be utilized to act on liquid bearing material as suggested in Ser. No. 548,666.

Accordingly, this application relates to methods and apparatus for treating moisture bearing material with alternately arranged non-uniform electrostatic fields with or without the action of sonic or ultrasonic vibration of the material and/or with or without dielectrically heating the moisture of the material.

In particular, the above-mentioned related patent application, Ser. No 499,178, and its chain of related patent applications set forth in the first paragraph above, sets forth various embodiments wherein fluid is to pass through a plurality of non-uniform electrostatic fields with each field having the higher intensity portion thereof substantially oppositely located relative to the higher intensity portion of an adjacent non-uniform field and at least partially extending across the fluid whereby it is believed that the action of the non-uniform fields will remove and/or separate particles from the fluid passing through such fields.

The other above-mentioned related patent application, Ser. No. 548,666, and its chain of related patent applications set forth in the second paragraph above, illustrates and describes the passing of moisture bearing material through a plurality of alternately arranged non-uniform electrostatic fields, but does not claim such arrangement except in combination with dielectric heating of the moisture of the moisture bearing material.

Accordingly, it is the purpose of this application to fully illustrate and describe how moisture bearing material can be disposed in an arrangement of a plurality of alternately arranged non-uniform electrostatic fields and claim said apparatus and method.

Thus, one embodiment of this invention for treating moisture bearing material comprises means for creating a plurality of non-uniform electrostatic fields with each field having the higher intensity portion thereof substantially oppositely located relative to the higher intensity portion of an adjacent non-uniform field. Means are also provided for supporting the moisture bearing material so that the non-uniform fields at least partially extend across the material to act on at least part of the moisture thereof to tend to move at least part of the moisture relative to the material.

In this connection, please see applicant's U.S. Pat. No. 3,543,408, which is part of an unrelated chain of patents hereinafter set forth and which discloses and claims the use of one or more non-uniform electrostatic fields for tending to draw moisture out of moisture bearing material. However, such fields are not alternately arranged as required by the present invention.

This unrelated chain of U.S. patents are all joint inventions and therefore are considered a separate inventive identity than the sole inventive identity of the instant application and its aforementioned related applications, the unrelated chain being U.S. Pat. Nos: 3,405,452; 3,470,716; 3,491,456; 3,543,408; 3,546,783; 3,633,282; 3,641,680; 3,667,130; 3,755,911 and 3,757,426.

Also, see the U.S. patent to Stiles, U.S. Pat. No. 3,705,847 and the U.S. patent to Heron et al., U.S. Pat. No. 3,449,230 for other examples of using electrostatic forces to remove moisture during the formation of a fiber mat, U.S. Pat. No. 3,705,847 also using electrostatic forces to remove moisture after the formation of the moisture bearing material, but not the alternately arranged fields of this invention.

Other patents that use electrostatic forces for removing moisture, but not the alternately arranged fields of this invention are the U.S. patents to Schwerin, U.S. Pat. Nos. 670,350; 670,351; 720,186 and 894,070, and the U.S. patent to Thomas, U.S. Pat. No. 2,740,756.

Accordingly, it is an object of this invention to provide an improved method for treating moisture bearing material, the method of this invention having one or more of the novel features set forth above or hereinafter shown or described.

Other objects, uses and advantages of this invention will be apparent upon a further reading of the description which proceeds with reference to the accompanying drawings forming a part thereof and wherein:

FIG. 1 is a fragmentary, perspective view illustrating electrodes and separators for providing one embodiment of the method and apparatus of this invention illustrated in FIGS. 2 and 3.

FIG. 2 is a vertical broken and fragmentary cross-sectional view of the apparatus of this invention.

FIG. 3 is a broken and fragmentary cross-sectional view taken on line 3—3 of FIG. 2.

FIG. 4 is a fragmentary, cross-sectional view of an improved apparatus and method of this invention, FIG. 4 being taken substantially on line 4—4 of FIG. 5.

FIG. 5 is a cross-sectional view taken substantially on line 5—5 of FIG. 4.

FIG. 6 is a view similar to FIG. 4 and illustrates another embodiment of this invention.

FIG. 7 is a cross-sectional view taken substantially on line 7—7 of FIG. 6.

FIG. 8 is a fragmentary perspective view illustrating how each row of electrode means for the structure of FIGS. 6 and 7 can be formed from a single sheet of material.

FIG. 9 is a cross-sectional view similar to FIG. 7 and illustrates another embodiment of this invention.

FIG. 10 is a view similar to FIG. 8 and illustrates how each row of electrode means of the embodiment of FIG. 9 can be formed from a single sheet of material.

FIG. 11 is a schematic view illustrating the method of utilizing a plurality of passage defining means of this invention for serially removing particles from various branch flows of fluid.

FIG. 12 is an end view of a sheet of material for making a passage defining means of this invention.

FIG. 13 is a cross-sectional view similar to FIG. 9 and illustrates the use of the sheet of material of FIG. 12 in forming another embodiment of this invention.

FIG. 14 is a fragmentary, cross-sectional view similar to FIG. 4 and illustrates another embodiment of this invention.

FIG. 15 is a cross-sectional view taken on line 15—15 of FIG. 14 and is rotated 90°.

FIG. 16 is a view similar to FIG. 15 and illustrates another embodiment of this invention.

FIG. 17 is a view similar to FIG. 15 and illustrates another embodiment of this invention.

FIG. 18 is a cross-sectional view taken on line 18—18 of FIG. 17 and is rotated 90°.

FIG. 19 is a view similar to FIG. 18 and illustrates another embodiment of this invention.

FIG. 20 is a view similar to FIG. 14 and illustrates another embodiment of this invention.

FIG. 21 is a cross-sectional view taken on line 21—21 of FIG. 20 and is rotated 90°.

FIG. 22 is a view similar to FIG. 21 and illustrates another embodiment of this invention.

FIG. 23 is a fragmentary perspective view of the embodiment of FIG. 21 or FIG. 22.

FIG. 24 is a schematic plan view illustrating part of the passage means of the device illustrated in FIG. 23.

FIG. 25 is a fragmentary, cross-sectional view illustrating another embodiment of this invention.

FIG. 26 is a fragmentary top view of the embodiment illustrated in FIG. 25.

FIG. 27 is a fragmentary cross-sectional view illustrating another embodiment of the electrode means for the apparatus of FIGS. 1–3.

Figure 28:
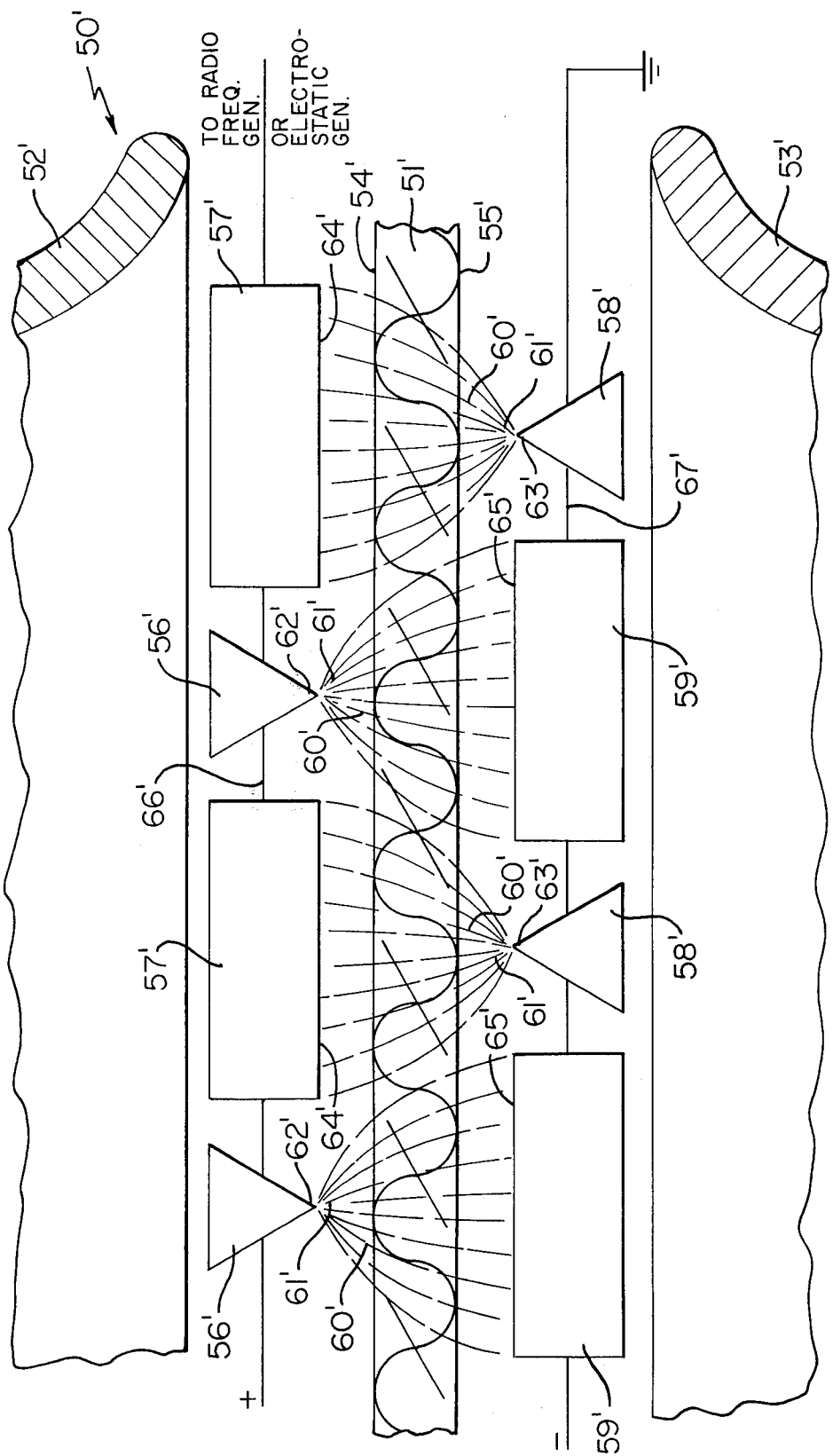
FIG. 28 is an enlarged, fragmentary, cross-sectional view illustrating another embodiment of the method and apparatus of this invention.

While the various features of this invention are hereinafter described and illustrated as being particularly adapted to remove moisture from a wet paper web, it is to be understood that the various features of this invention can be utilized singly or in any combination thereof to act on other types of moisture bearing materials as desired.

Therefore, this invention is not to be limited to not only the embodiments illustrated in the drawings, because the drawings are merely utilized to illustrate one of the wide variety of uses of this invention.

It is well known from the U.S. Patent to Candor et al., U.S. Pat. No. 3,641,680 that it has been suggested that the combination of vibrating action and electrostatic field action on the moisture of moisture bearing material will tend to remove such moisture from the moisture bearing material because it is believed that the vibrating action will tend to reduce the particle size of the moisture in the moisture bearing material to tend to reduce the capilliary holding action of the material on the moisture therein while the electrostatic field action will tend to sweep such reduced sized moisture particles from the moisture bearing material by an electro-osmotic action.

It is also well know that dielectric heating is utilized to remove moisture from moisture bearing material by passing the moisture bearing material through a high-intensity, high-frequency electric field such as is produced by a radio frequency generator.

In the case of dielectric heating wet fibrous webs, such as paper or pulp, it is well known, from an article in the December 1974 "Journal of the Technical Association of the Pulp and Paper Industry," Volume 5, No. 12 on page 134 and entitled, "An Updated Review of Dielectric Heating in the Paper, Pulp and Board Industries" by T. L. Wilson, that the dielectric heating of the web of material causes the moisture particles in the center portion of the web of material to rapidly turn to steam which explodes outwardly toward the opposed sides of the web of material and carries with it other particles of liquid water that are subsequently caught adjacent the opposed surfaces of the web of material by the more dense and hard surface layers thereof which are sufficiently porous to permit the passage of vapor, but not the moved particles of moisture.

Thus it was believed, according to the teachings of the invention set forth in the aforementioned patent application, Ser. No. 548,666, that if the moisture particles in such web of material are reduced in size by a sonic or ultrasonic vibrating action, the dielectric heating process will be improved as the reduced size particles of moisture being swept along by the exploding central portion of steam in the web can more readily be pushed out through the denser outer layers of the web of material. Also, the dielectric heating action on the reduced sized particles more rapidly heats up the same. Also, it is believed, according to the teachings of this invention, that if an electrostatic field action is also acting on the dielectric heated material, such electrostatic field action will assist the steam action in moving the moisture particles toward the outer layers of the web of material through the force of the electrostatic field action thereon and also will tend to remove the moisture from the outer surfaces or layers of the material for the reasons previously set forth.

In particular, such method and apparatus of the invention of Ser. No. 548,666 is generally indicated by the reference numeral 50' in FIG. 28 and is utilized for drying a wet web 51' of fibrous material as the same is passed from left to right through the apparatus 50', the method and apparatus 50' combining the use of vibrating action as caused by audible or inaudible sound producing horns 52' and 53' respectively disposed on opposite sides 54' and 55' of the web 51' with electrostatic means comprising a plurality of upper electrodes 56' and 57' disposed in aligned relation or row and a cooperating row of lower electrodes 58' and 59' in a manner hereinafter described whereby the upper and lower electrodes 56', 57' and 58', 59' cooperate therebetween to define a plurality of alternately arranged non-uniform electrostatic fields 60' each having the higher intensity portion 61' thereof substantially oppositely located relative to the higher intensity portion 61' of the next adjacent field 60' as illustrated whereby the web of material 51' passes through the non-uniform fields 60' to be operated on in a manner hereinafter described. In addition, the electrodes 56'–58' can be utilized to dielectrically heat the web 51' as the same passes therebetween in a manner hereinafter described.

The vibration producing horns 52' and 53' for the apparatus 50' can be of the type set forth in the U.S. Patent to Rodwin et al, U.S. Pat. No. 3,694,926, so that the sonic or ultrasonic sound waves thereof can pass through the spacing between the adjacent electrodes 56', 57' and 59', 58' to respectively impinge against the surfaces 54' and 55' of the web of material 51' to vibrate the same to tend to reduce the particle size of the moisture particles contained therein so that the reduced sized moisture particles can be more readily swept away by the electrostatic fields 60' as well as be more readily heated up through the dielectric heating action of the electrodes 56'–59'.

The electrodes 56' of the upper row of electrodes and the electrodes 58' of the lower row of electrodes are substantially pointed at the ends 62' and 63' thereof which respectively face toward the sides 54' and 55' of the web 51' while the upper and lower electrodes 57' and 59' are relatively wide and flat so as to respectively present flat surfaces 64' and 65' substantially opposite the pointed ends 63' and 62' of the smaller electrodes 56' and 58' with such electrodes 56'–59' respectively extending completely laterally across the width of the web 51' of material so that the non-uniform fields 60' formed between each cooperating pair of electrodes 56', 59' and 57', 58' extends the entire width of the web 51' of material to act on the moisture particles therein to tend to move the same respectively toward the more intense portions 61' of the respective fields 60' as well as to tend to remove the moisture particles adjacent the surfaces 54' and 55' toward the points 62' and 63' of the smaller electrodes 56' and 58' for the reasons fully set forth in the patent to Candor, U.S. Pat. No. 3,849,275, wherein the use of alternately arranged non-uniform electrostatic fields are disclosed and claimed.

The upper row of electrodes 56' and 57' are respectively electrically interconnected together by conductor means 66' so as to all be interconnected to a radio frequency generator, (not shown) while the lower row of electrodes 58' and 59' are adapted to be electrically interconnected together by a conductor 67' to ground and/or to the opposite terminal of the generator whereby the operation of the radio frequency generator will cause the upper electrodes 56', 57' to rapidly have the polarity thereof reversed (as well as the lower electrodes 58' and 59' through induction) so that the resulting high intensity, high frequency electric fields 60' will cause the moisture particles in the material 51' to heat up dielectrically and change some of the same into steam to be expelled out of the opposed sides 54' and 55' of the web 51' in the manner well known in the art of dielectric heating.

Alternately, the conductors 66' and 67' for the electrodes 56'–59' can be interconnected to an electrostatic generator to produce constant non-uniform electrostatic fields 60' to cooperate with the vibrating means 52' and 53' in the manner previously described except that the non-uniform fields 60' will tend to move the moisture particles more readily toward the higher intensity portions 61' of the fields 60' thereof through the phenomenon known as "dielectrophoresis."

The operation of the method and apparatus 50' of FIG. 28 will now be described.

As the wet web 51' of fibrous material passes from left to right through the apparatus 50', the dielectric heating of the particles therein occurs through the action of the high frequency, high intensity fields 60' thereon whereby there is a tendency for the dielectrically heated moisture particles in the central portion of the web 51' to heat up more rapidly than the particles adjacent to the outer surfaces thereof so that as the central moisture particles are changed to vapor, the rapidly expanding steam explodes outwardly toward the outer surfaces 54' and 55' of the web of material 51' and tends to entrain the other moisture particles therewith except that such other moisture particles are trapped in the outer and more dense layers of the fibrous material 51' adjacent the outer surfaces 54' and 55' thereof. Such effect of moving moisture particles to the outer areas of the surfaces 54' and 55' of the web 51' is described as a "bonus effect" of dielectric heating in the aforementioned article of the "Journal of the Technical Association of the Pulp and Paper Industry" as the web of material 51' is to be subsequently further dried by being moved into contact with heated cylinders known as "cans" which further evaporate the moisture therein through a high heating thereof.

However, it is believed that the vibration of the web 51' by the horns 52' and 53' producing audible or inaudible sound waves that pass between the electrodes 56', 57' and 58', 59' and impinge against the surfaces 54' and 55' of the web 51' will reduce the moisture particles size in the web 51' so that not only do the central particles more rapidly heat up through the aforementioned dielectric heating thereof, but also the moisture particles that are entrained in the resulting exploding steam of the vaporized moisture particles are more readily forced through the denser parts of the outer portions of the web material 51' adjacent the surfaces 54' and 55' thereof to be expelled out of the same. Also, because the particles of the web 51' have been reduced in size by the vibration of the web 51', those particles closer to the outer surfaces 54' and 55' are more readily heated up dielectrically because of the size thereof having been reduced. Further, because of the non-uniform shape of the fields 60', the fields 60' themselves tend to move the moisture particles toward the more intense portions 61' thereof so that for a moisture particle above the center line of the web of material 51' every other field 60' will tend to move that moisture particle closer to the upper surface 54' by the phenomenon of "dielectrophoresis" whereas the reverse facing non-uniform fields 60' have negligible effect thereon because particles in the upper portion of the web 51' are more influenced by the more intense portions 61' of the fields 60' than the less intense portions thereof. Conversely, moisture particles in the web of material 51' below the center line thereof are more influenced by the downwardly directed intensive portions 51' of the fields 60' so that the moisture particles are moved toward the lower surface 55' by such fields.

Therefore, it is believed that by combining the effects of dielectric heating, vibration and electrostatic field action on the moisture particles in the web 51' as the same passes from left to right through the apparatus 50', the web 51' will have the moisture thereof more rapidly removed that if only dielectric heating thereof takes place, only vibration thereof takes place or only electrostatic field action takes place thereon. However, it is to be understood that the dielectric field action can take place with just the vibrating action produced by the horns 52' and 53' or other vibration producing means or the dielectric heating action can take place with just the addition of the non-uniform electrostatic field effect previously described.

Figure 30:
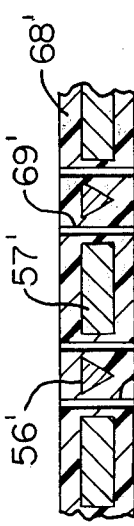
FIG. 30 is a fragmentary cross-sectional view illustrating one of the belt means of the apparatus and method of FIG. 29.

If desired, the upper row of electrodes 56', 57' and lower row of electrodes 58', 59' could each be encased in an insulating material 68' in the manner illustrated in FIG. 30 so that no shorting or arcing across the web of material 51' can take place, the insulating material 68' having suitable holes 69' passing therethrough between the adjacent electrodes therein as well as perhaps even passing through the larger electrodes as desired whereby not only can the sound waves pass through the holes 69' to impinge against the material 51', but also the ejected steam from the web 51' of material can pass out through the openings 69'.

Figure 29:
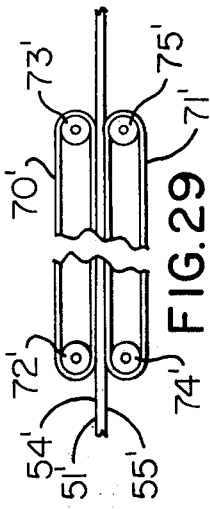
FIG. 29 is a reduced schematic view illustrating a modification of the embodiment of FIG. 28.

Further, the insulating material 68' could be so flexible so that the same can form an endless belt arrangement such as illustrated in FIG. 29 wherein two electrode belts 70' and 71' are respectively looped around rollers 72', 73', 74' and 75' so that the web of material 51' can have its opposed sides 54' and 55' respectively disposed in contact with the adjacent runs of the upper and lower belts 70' and 71' to move in unison therewith from left to right whereby the electrodes will perform the dielectric heating function as well as the electrostatic attracting function in the manner previously described and as set forth in the aforementioned U.S. patent application, Ser. No. 405,023. Of course, vibration of the web 51' can also take place between the belts 70' and 71' for the reasons previously set forth, such as by vibrating one or both belts 70' and 71' to thereby vibrate the wet web 51' therebetween.

Therefore, it can be seen that the vibrating action and/or the electrostatic action causes the moisture particles to more readily move to the outer layers of the web of material 51' during the dielectric heating operation as well as remove the same from the outer layers through the smaller sized particles either being more readily vaporized by the dielectric heating thereof, more readily being blown out by the escaping steam because the same are smaller in size through the vibration thereof, or more readily drawn out of the outer layers thereof through the force of the electrostatic field action thereon.

However, as previously stated, it is the purpose of this invention to claim the non-uniform field action on a fibrous web or other moisture bearing material of FIGS. 28 and 29 without the vibration action and without the dielectric heating action as the combined actions are being claimed in Ser. No. 548,666. Thus, it can be seen that FIGS. 28 and 29 do not set forth a method and apparatus where relative movement is created between moisture bearing material and a plurality of alternately arranged non-uniform electrostatic fields to tend to remove moisture from the moisture bearing material by the electrostatic field action.

Therefore, it will be appreciated that moisture bearing material can be passed through the passage defining means of the apparatus illustrated in FIGS. 1–27 rather than the fluid being described and illustrated as passing therethrough as it is believed that the alternately arranged non-uniform electrostatic fields of FIGS. 1–27 will tend to remove moisture from the moisture bearing material for the reasons previously set forth. Thus, while the following description of FIGS. 1–27 refers to fluid being acted on in the various passage defining means, please consider that moisture bearing material could also be passed through such passage defining means in various configurations thereof, such as in thread or rope form, etc., and that the various exits of such passage defining means can be used for removing the removed moisture of the moisture bearing material.

Accordingly, reference is now made to FIGS. 4 and 5, wherein an improved method and apparatus of the invention of Ser. No. 499,178, is generally indicated by the reference numeral 10 and comprises a tubular passage defining means 11 formed from electrically insulating material and having an inlet end or means 12 and an outlet end or means 13 with a plurality of exit means 14 intermediate the inlet means 12 and the outlet means 13 in a predetermined arrangement for a purpose hereinafter described.

For example, each exit means 14 can be formed integrally with the passage defining means 11 and has an opening 15 adjacent the internal peripheral surface 16 of the passage defining means 11, the exit means 14 being arranged into aligned rows 14A and 14B that are disposed parallel to each other and on opposite sides of the passage defining means 11 in a staggering relationship so that one of the exit means 14 in the lower row 14B illustrated in FIG. 4 is disposed substantially half way between an adjacent pair of exit means 14 in the upper row 14A illustrated in FIG. 4.

Adjacent each exit means 14 on the upstream side thereof, a small electrode means 14 is disposed in the electrical insulating material 18 of the passage defining means 11 so as to be disposed out of electrical contact with any liquid that would be passing through the passage defining means 11, each electrode 17 being suitably shaped, such as being pointed or the like, to enhance the degree of electrostatic attraction by the resulting non-uniform field as will be apparent hereinafter, Diametrically opposite each small electrode 17 is a large electrode means 20 also disposed in the electrical insulating means 18 of the passage defining means 11 so as to be electrically insulated from any liquid passing through the passage defining means 11. As illustrated in the drawings, the large electrode means 20 is substantially semicircular as illustrated in FIG. 5 and is substantially bisected by its respective opposed small electrode 17.

In this manner, it can be seen that there are two rows 17A, 20A and 17B 20B of electrode means 17 and 20 disposed in parallel aligned relation on opposite sides of the passage defining means 11.

Thus, in each row 17A, 20A or 17B, 20B of electrode means 17 and 20, a large electrode means 20 is interposed in spaced relation between each adjacent pair of small electrode means 17 of the same row thereof whereby each large electrode means 20 is disposed between each exit means 14 disposed in the same row therewith.

The electrode means 17 and 20 are adapted to be charged by an electrostatic means 21 illustrated in FIG.

5 wherein one potential of the electrostatic means 21 is interconnected by suitable lead means 22 to all of the electrode means 17 and 20 in the upper row 17A, 20A of electrodes and the opposite potential of the electrostatic means 21 is interconnected by lead means 23 to all of the electrode means 17 and 20 in the lower row 17B, 20B of electrode means for the passage defining means 11.

For example, when viewing FIG. 4, the electrostatic means 21 is adapted to charge the electrode means 17 and 20 in the lower row 17B, 20B with a positive potential and to charge the electrode means 17 and 20 in the upper row 17A, 20A with an opposite negative charge.

In this manner, non-uniform electric fields are created between each pair of opposed electrode means 17 and 20 with such non-uniform fields being indicated by the reference numeral 24 in FIGS. 4 and 5. The non-uniform electrostatic fields 24 are so arranged that the more intense portion of each electrostatic field 24 between each pair of opposed small and large electrode means 17 and 20 is adjacent to the opening 15 of an exit means 14 disposed adjacent the small electrode 17 of the particular electrostatic field 24.

In this manner, it is believed that when fluid is delivered into the inlet means of the passage defining means 11 by a directing means 25, each electrostatic field 24 operates on the particles thereof in such a manner that the positively charged particles as well as some of the neutral or uncharged particles are drawn to the negatively charged electrode means 17 and 20 in the upper row 17A, 20B of electrode means while the negatively charged particles and some of the neutral or uncharged particles are drawn toward the positively charged electrode means 17 and 20 in the lower row 17B, 20B of electrode means.

Because the more intense portion of each electrostatic field 24 is adjacent the opening 15 of a particular exit means 14, it can be seen that as the fluid passes from left to right in FIG. 4 through the passage defining means 11, the first left-hand electrostatic field 24 will tend to gather the positively charged particles, as well as some of the neutral particles, and cause the same to move along the electrostatic field 24 toward the small electrode 17 adjacent the opening 15 of the first left-hand upper exit means 14 so that the same will pass out through the exit means 15 with a small portion of the fluid passing through the passage defining means 11 from left to right. Such first electrostatic field 24 while having a less intensive portion adjacent the first left-hand large electrode means 20, nevertheless, will tend to attract some of the negatively charged particles toward the lower portion of the passage defining means 11 so that when the same are conveyed further to the right by the means 25 passing the fluid through the passage defining means 11, the same will enter the more intense portion of the second left-hand electrostatic field 24 which is adjacent the inlet means 15 of the first left-hand lower exit means 14 so that the collected negatively charged particles, as well as some of the neutral particles, together with a small portion of the fluid passing through the passage defining means 11 will pass out through that particular exit means 14.

The second left-hand electrostatic field 24 likewise has the less intense portion thereof adjacent the large electrode 20 thereof but will still gather some of the positively charged particles that have passed the first exit means 14 toward the upper portion of the passage defining means 11 so that the same will enter the more intense portion of the electrostatic field 24 which is third from the left and is adjacent the opening 15 of the right-hand upper exit means 14.

Thus, it can be seen that as the fluid passes from left to right in FIG. 4, portions of the positively charged particles as well as part of the neutral particles thereof are removed from the fluid out through the upper row 14A of exit means 14 while the negatively charged particles as well as some of the neutral particles are removed out through the bottom row 14B of exit means 14 and, depending upon the particles of the fluid and the number of exit means 14, substantially particle free fluid will reach the outlet means 14 of the passage defining means 11 to be removed by a moving means 26.

Therefore, since the electrode means 17 and 20 of this invention are not disposed in electrical contact with the fluid passing through the passage defining means 11, no current flow or loss is created and the charged particles are merely moved toward the particular exit means 14 by the force of the non-uniform fields 24 in the manner previously described. so that the only work required by the apparatus and method of this invention is the work required to force the fluid through the passage defining means 11.

However, it is well known that if the passage defining means 11 is tilted at an angle with its inlet means 12 being higher than its outlet means 13, gravity will provide the work for passing a liquid through the passage defining means 11 provided a sufficient head of liquid is provided at the inlet means 12 thereof.

Also, it is to be understood that while the passage defining means 11 has been illustrated and described as having an upper row 14A of exit means 14 and a lower row 14B of exit means 14, such exit means 14 can be provided on opposed sides of the passage defining means 11 in opposed relation rather than across the top and bottom of the passage defining means 11 as described and illustrated.

The flow of fluid from the fluid supply means 25 for the passage defining means 11 can be so controlled relative to the sizes of the exit means 14 and the fluid receiving means 26 that sufficient fluid can be supplied by the means 25 into the passage defining means 11 without requiring a stepped reduction in the cross-sectional dimension of the passage defining means 11 downstream from each exit means 14. For example, the exit means 14 can each have restriction means therein so as to limit the amount of fluid passing therethrough and the outlet means 13 could also have a restriction means therein to limit the amount of fluid passing through the outlet means 13 whereby the rate of flow through the conduit means 11 can be readily controlled in relation to the amount of fluid entering the inlet means 12 thereof, as desired.

While the various features of this invention have been described as providing the non-uniform electrostatic field means by having external means continuously charging the electrode means 17 and 20 in the manner previously described, it is to be understood that permanent non-uniform electrostatic fields can be provided by utilizing suitably shaped permanent electrets, such as the electret material fully set forth in the U.S. Pat. No. 3,458,713, issued July 29, 1969.

In U.S. Pat. No. 3,458,713 there is disclosed an electret material that can provide a high electric field of sensibly permanent duration and a full disclosure is provided as to how such electret material can be formed, the resulting electret being described as the electric analog of a permanent magnet.

It is believed that such electret material when formed in sheet form will have one polarity on one side thereof and an equal and opposite polarity on the other side thereof with such material permanently maintaining such polarity or charge for a long period of time, e.g., 10 years.

Accordingly, reference is now made to FIGS. 6, 7 and 8 wherein another method and apparatus of the invention of Ser. No. 499,178, is generally indicated by the reference numeral 10A and the parts thereof similar to the method and apparatus 10 of FIG. 4 are indicated by like reference letter "A".

As illustrated in FIGS. 6 and 7, the method and apparatus 10A comprises a tubular passage defining means 11A having inlet means 12A and outlet means 13A to be respectively interconnected to the fluid feeding means 25 and removing means 26 in the manner previously described, the passage defining means 11A having a plurality of exit means 14A provided with entrances 15A in a manner similar to the passage defining means 11 of FIG. 4.

However, the electrode means for providing the non-uniform electrostatic fields across the passage defining means 11A with the more intense portions thereof respectively adjacent the entrance means 15 of the exit means 14A are formed from similar strips of electret material such as the electret strip 25 illustrated in FIG. 8. As illustrated in FIG. 8, the electret strip 25 has opposed surfaces 26 and 27 respectively provided with like opposed permanent charges in the manner fully set forth in the aforementioned U.S. Pat. No. 3,458,713. Thereafter, the strip 25 is slit at its top and bottom edges 28 and 29 in the manner illustrated in FIG. 8 in an alternating fashion so that angled fins 30 can be formed therefrom in the manner illustrated in FIG. 8. The resulting electret strip 25 is embedded in the insulating material of the passage defining means 11A as illustrated in FIGS. 3 and 4 whereby each finned part 30, by being folded in the manner illustrated in FIG. 7, cooperates with the unfolded part 30' of an oppositely disposed strip 25 to provide a respective and permanent non-uniform electrostatic field with the more intense portion thereof adjacent a particular entrance means 15A of an exit means 14A.

Of course, the electret strip 25 utilized for the lower set of exit means 14A has the side thereof facing the upper electret strip 25 oppositely charged to the facing side of the upper electret strip so as to provide the non-uniform electrostatic fields in the manner previously described for the purposes previously described. In order to prevent the fluid passing through the passage defining means 11A from actually engaging the finned portions 30 of each electret strip 25 adjacent their respective exit means 14A, the entrance 15A of each exit means 14A is bifurcated around the particular finned portion 30 as illustrated by the passages 31 and 32 in FIG. 7 which rejoin on the other side of the particular finned portion 30. Thus, even the finned portions 30 are protected from direct contact with the fluid or other material being directed through the passage defining means 11A.

In this manner, since the electret material is forming permanent non-uniform electrostatic fields across the passage defining means 11A, the non-uniform electrostatic fields function in the manner previously described to remove the particles in the manner previously described.

Of course, the electret strip 25 can have the parts thereof forming the more intense portions of the electrostatic fields formed in other configurations as desired.

For example, reference is now made to FIGS. 9 and 10 wherein another method and apparatus is generally indicated by the reference numeral 10B and parts thereof similar to the apparatus 10A are indicated by like reference numerals followed by the reference letter "B".

As illustrated in FIGS. 9 and 10, the slit portions of each electret strip 25A have been formed into cylindrical parts 33 to respectively cooperate with unformed parts 34 of the opposite strip 25A in the manner illustrated in FIG. 9 to provide the permanent non-uniform electrostatic fields across the passage defining means 11B with the more intense portions thereof being adjacent the entrances 15B of the exit means 14B.

Should it be found that the electret material can be of the type which will not be readily attacked by the particle containing fluid actually engaging the same or have the life or the permanency of its charge changed in an adverse manner, the electret material itself could form the passage defining means.

For example, reference is now made to FIGS. 12 and 13 wherein another method and apparatus is generally indicated by the reference numeral 10C and parts similar to the means 10 previously described are indicated by like reference numerals followed by the reference letter "C".

As illustrated in FIG. 12, a single strip of material 35 that can be formed with a permanent charge is only charged in the areas 36 and 37 thereof in the manner as set forth in the aforementioned U.S. Pat. No. 3,458,713 except that each part 36 has its upper side with a positive charge and its lower side with a negative charge while each part 37 has its upper side with a negative charge and the lower side thereof with a positive charge. In addition, each charged area 37 is greater than its cooperating area 36 except that each area 36 has a permanent charge greater per square inch thereof than the charge per square inch on the cooperating area 37 thereof so that when the strip 35 is subsequently formed into the tubular form as illustrated in FIGS. 13, each two charged areas 36 and 37 cooperate together to define a non-uniform field across the passage defining means 10C with the more intense portion thereof being adjacent an entrance means 15C of an exit means 14C for the purpose previously described.

Therefore, by taking the strip of material 36 and selectively and permanently forming the same into electret areas throughout the length thereof so that when the same is subsequently formed into tubular form, a plurality of permanent non-uniform electrostatic fields can be provided in an alternating manner across the tubular structure of 11C in much the same manner as the non-uniform fields provided by the charged electrodes 17 and 20 of FIG. 4 and the electret strips 25 in the embodiment of FIG. 6.

Also, it is to be understood that it may be found that when utilizing the electret feature of this invention, the larger electrode of each cooperating pair of electrets can have a greater or lesser charge per square inch thereof than the charge per square inch of the smaller electrode portion cooperating therewith to provide the desired results for removing the contaminants from the liquid passing through the particular passage defining means.

Further, it is to be understood that the electrode configurations of FIGS. 6–13 are not limited to electrets as such electrode configuration could provide for externally charged electrodes, as desired.

Therefore, it can be seen that improved methods and apparatus are provided for removing and/or separating particles from a fluid or the like carrying the same by electrostatic means which comprises charged electrode means or electret means electrically insulated from the fluid or the like that is passed through the passage defining means or arranged so as to be free from adverse effects of the fluid.

While the various passage defining means have been illustrated with each exit means thereof merely expelling its fluid, it is to be understood that each exit means could be the source for feeding fluid into a new passage defining means constructed in the same manner as the upstream passage defining means.

For example, reference is made to FIG. 11 where such a network of passage defining means 11 are interconnected together whereby various concentrates, etc., can be collected at desired points downstream thereof.

While the various passage defining means previously described have each been provided with projections 15 extending into the fluid passage 16 to provide means for exiting the attracted particles out of the exit means 14 in the manner previously described, it may be found that such projections 15 provide too much turbulence for a desired fluid flow rate through the passage defining means. If so, then a true laminar flow means can be provided for the fluid with the particles removing features of this invention being substantially the same.

For example, reference is now made to FIGS. 14 and 15 wherein another method and apparatus is generally indicated by the reference numeral 10D with parts thereof similar to the other methods and apparatus being indicated by like reference numerals followed by the reference letter "D".

As illustrated in FIGS. 14 and 15, a first passage defining means 11D is mounted concentrically within an outer passage defining means 40 while being supported therein by a support means 41 in the manner illustrated in FIG. 15 to provide a space or passage 42 between the conduits or passage defining means 11D and 40. The inner passage defining means 11D has openings or exit means 14D passing therethrough in an alternating manner along diametrically opposed rows as illustrated in FIG. 14 while the outer tubular member 50 carries a plurality of smaller electrode means 17D and large electrode means 20D in a manner similar to the electrode means 17 and 20 of FIG. 4 so as to cooperate together to provide alternating non-uniform electrostatic fields across the passage defining means 11D with the fields respectively having the more intense portions thereof passing through the exit means 14D as illustrated in FIGS. 14 and 15.

Thus, since all of the electrode means 17D and 20D in the upper row thereof are of a like charge while the small and large electrode means 17D and 20D in the bottom row thereof in FIG. 14 are of a like and of an opposite polarity from the upper row, particles of one charge will be attracted out through the upper exit means 14D while particles of the opposite polarity will be directed out of the lower exit means 14D in the same manner as provided by the apparatus 10 of FIG. 4 except that the entire fluid flow through the inner conduit means 11D is a true laminar flow thereof and the flow between the conduits 11D and 40 is also a true laminar flow so that the oppositely attracted particles being received in the space 42 between the conduits 11D and 40 will mix to complement each other whereby there will be no particle travel back through the exit means 14D into the inner conduit means 11D.

Thus, it can be seen that the apparatus 10D provides for true laminar flow through the inner conduit means 11D while still utilizing the principles of alternating non-uniform electrostatic fields for the purpose previously described.

Also, instead of having externally charged small and large electrode means 17D and 20D, the alternating non-uniform electrostatic field arrangement of FIGS. 14 and 15 can be provided by a permanent electret structure previously described by forming the outer conduit 40 of electret material in substantially the same manner as provided by the material 35 in FIGS. 12 and 13. Alternately, such electret material can be embedded into insulating material forming the outer conduit 40, if desired.

For example, reference is now made to FIG. 16 wherein another embodiment is generally indicated by the reference numeral 10E and parts thereof similar to the apparatus 10D are indicated by like reference numerals followed by the reference letter "E".

As illustrated in FIG. 16, the outer conduit means 40E has an upper row of alternating small and large electrodes 36E and 37E in a manner similar to the sheet 35 so that alternating non-uniform electrostatic fields can be provided between the large and small electrode means 36E and 37E so that the more intensive portion thereof will be passing through an opening means 14E in the inner conduit 11E to produce the non-uniform electrostatic field effect as illustrated in FIG. 14.

Of course, in the embodiments of FIGS. 14–17, as well as in the embodiments of FIGS. 17–19, the support means 41 between the inner and outer conduits could be located in a 6 o'clock position rather than at the 9 o'clock position illustrated to better support the inner conduit.

Referring now to FIGS. 17 and 18, another embodiment is generally indicated by the reference numeral 10F and parts thereof similar to the apparatus 10D of FIG. 14 will be indicated by like reference numerals followed by the reference letter "F".

As illustrated in FIGS. 17 and 18, the outer conduit means 40F carries the small electrode means 17F while the inner conduit means 11F carries the large electrode means 20F that cooperate therewith to provide the alternating, non-uniform electrostatic fields respectively having the intense portions thereof passing through opening means 14F in the inner conduit means 11F to provide the non-uniform electrostatic field effect illustrated in FIGS. 17 and 18 for the purpose previously described. The external charging means 21F can charge the large electrode means 20F through the supporting arrangement 41F between the inner and outer conduits 11F and 10F in the manner illustrated in FIG. 18.

As illustrated in FIG. 19, the electrode arrangement of the embodiment 10F of FIGS. 17 and 18 can be provided by the embodiment 10G wherein the outer conduit 40G is provided with the small electrets 36G while the inner conduit 11G is provided with the large electret areas 37G to provide the alternating non-uniform electrostatic field arrangement similar to the field arrangement illustrated in FIGS. 17 and 18.

Therefore, it can be seen that in the embodiments illustrated in FIGS. 14–19, a laminar flow of the liquid or fluid passing through the inner conduit means is provided as a laminar flow of liquid or fluid is also being provided in the space between the inner and outer conduits so that there is no disturbance in the fluid flow even though the particles are being moved into the space between the two conduits by the alternating non-uniform electrostatic field patterns previously described.

Also, it is to be understood that any adverse fields being created by ionic separation in the embodiments of FIGS. 4–19 can be neutralized in well known manners, such as by bringing ions of opposite polarity adjacent the removed ions such as in the embodiments of FIGS. 20 and 25 hereinafter described. However, it is believed that ionic neutralization will take place in the inner, outer conduit arrangement of FIGS. 14–19 because of the non-uniform field arrangement.

Should it be desired to provide the laminar flow previously described through the inner conduit without providing a completely surrounding outer conduit means as provided in the embodiments 14–19 for receiving the removed contaminants, another embodiment can be utilized and is generally indicated by the reference numeral 10H in FIGS. 20 and 21 with parts thereof similar to apparatus 10D being indicated by like reference numerals followed by the reference letter "H".

As illustrated in FIGS. 20 and 21, a main conduit means 11H is provided with the same carrying a plurality of large electrode means 20H which respectively cooperate with small electrode means 17H respectively being carried by an outer tubular conduit means 43 snaking about and being secured to the conduit means 11H in the manner illustrated in FIGS. 20, 21 and 23 so that the small electrode means 17H being carried by the outer conduit means 43 will be opposite an opening 14H in the main conduit 11H and cooperate with a large electrode 20H with the intense portion of the resulting field passing through the respective opening 14H.

Since the fluid flow in the outer winding conduit 43 must travel a greater distance between adjacent exit means 14H than the distance the fluid in the inner conduit means 11H must travel, the passage defining means 43 can be suitably inwardly necked at areas 44 between enlarged portions 45 thereof as illustrated in FIGS. 23 and 24 so as to speed up the flow of fluid therethrough because the large portion 45 thereof will be adjacent the exit means 14H, the enlarged portion 45 slowing down the fluid flow therethrough so as to be of the same speed as the speed of flow of the fluid passing through the larger conduit means 11H.

In this manner, as an upper small electrode means 17H of the embodiment 10H of FIG. 20 attracts its particular charged particles into the passage means 43 through the upper exit 14H, such charged particles are brought down to the next exit means 14H in the lower row of electrode means so as to be combined with the oppositely charged particles being brought into the passage defining means 43 by the lower electrode means 17H so as to tend to neutralize the particle content in the passage defining means 43 whereby there will be no attempt for such particles therein to reenter the main conduit means 11H through the passage means 14H.

Another embodiment for providing true laminar flow of the fluid having the particles removed therefrom is generally indicated by the reference numeral 50 in FIGS. 25 and 27 and comprises a housing means 51 having a plurality of compartments or passage means 52A, 52B, 52C, 52E, 52F, etc., circularly arranged throughout the length thereof whereby the particles in passages 52B and 52E are respectively removed either into the intervening passage means 52C or into the outboard passage means 52A and 52F as will be apparent hereinafter.

The walls 53 and 54 between the compartments 52B, 52C, 52E have exit means 55 passing therethrough in a manner similar to the exit means 14B previously described while the walls 56 and 57 respectively between the compartments 52A, 52B, and 52E, 52F likewise have exit means 55 passing therethrough as illustrated in FIG. 26 so as to cooperate with large and small electrode means 58 and 59 similar to the electrode means 17 and 20 in producing alternating non-uniform electrostatic fields across the passage means 52B and 52E as illustrated in FIG. 26 for alternately removing the particles thereof out through the exits 55 so that charged particles of one polarity from the compartment 52B entering the compartment 52C will be joined by oppositely charged particles from the compartment 52B entering the compartment 52C. This feature is provided by having the external charging means 60 charging small electrodes 59 that operate on the exits 55 of the wall 53 with a charge opposite from the charge on the small electrodes 59 which operate on the exit means 55 in the wall 54.

Similarly the particles being drawn into the compartment 52A from the compartment 52B through the exits 55 and in the wall 56 will be combined with oppositely charged particles also being drawn into the chamber 52A from the next adjacent passage menas on the other side of the wall 61 in the manner previously described. Likewise the compartment 52F is drawing particles of one polarity through the exit means from the compartment 52E through the exit means 56 of the wall 57 into the compartment 52F to be combined with oppositely charged particles being drawn from the compartment on the other side of the wall 62 in the manner previously described.

Therefore, it can be seen that the embodiment 50 permits alternating chambers in a circular arrangement of such chambers to be progressively decontaminated while every other passage therethrough has the concentration of particles therein increased, the entire fluid flow through the various passages of the embodiment 50 being true laminar flow arrangements.

In regard to FIG. 22, it can be seen that the arrangement provided therein is substantially the same as FIGS. 20 and 21 except that the large electrodes comprise electret areas 37J carried by the main passage defining means 11J and that the small electrodes comprise electret areas 36J carried by the small winding outer passage means 43J.

Thus, while it is believed that the embodiments of FIGS. 4–13 will remove particles by the alternating non-uniform electrostatic field arrangements previously described even though the exit means 14 have projections 15 extending into the main flow streams, the various features thereof could be utilized with true laminar flow of the fluids having the particles removed therefrom as provided by the embodiments illustrated in FIGS. 14–26.

It can be seen that in each of the previously described embodiments, it may be found that the magnitude of the potential differential between each pair of cooperating large and small electrodes that creates a particular non-uniform electrostatic field need not necessarily be relatively large because it is believed that it is the intensity of the field lines adjacent the smaller electrode at the exit means of the apparatus that provides the greatest attraction for the oppositely charged particles as well as for the neutral particles, etc., and permits the same to be gathered toward each other and forced out of the exit means even though the like charges thereon tend to push them apart whereby adverse field forces created by charged particles separation are believed to be minimized. Of course, large potential differentials can be utilized if desired.

Further, when utilizing the above-described features in connection with an oppositely moving charged particle separation stream, such as in FIGS. 25 and 26, it can readily be seen that any adverse field forces provided by charged particle separation are substantially eliminated.

Another embodiment for utilizing the above-described features is illustrated in FIGS. 1–3 and is generally indicated by the reference numeral 70, the apparatus and method 70 comprising a plurality of plates disposed in stacked relation to define a plurality of parallel passages therebetween in much the same manner as provided by the well known electrodialysis process. Thus, the various plates of the apparatus 70 can be stacked in the vertical position illustrated in FIG. 2 so that fluid flow therebetween can be upwardly or downwardly in a vertical direction or the plates can be disposed horizontally so that the fluid flow therebetween will be in a horizontal direction.

In any event, the apparatus 70 comprises a plurality of electret plates 71 each being suitably formed in a like manner to define a plurality of large rectangular or square sections 72 interconnected together at the corners thereof and interconnected intermediate the same in a horizontal direction by small rectangular sections 73 as illustrated. The electret plates 71 are arranged in the stack 70 as illustrated in FIG. 2 so that the adjacent facing sides thereof has an opposite charge thereon whereby it can be seen that the plate 71A in FIG. 2 has the left hand side 74A thereof provided with a positive charge while the right hand side 75A thereof is provided with a negative charge. The electret plate 71B of the apparatus 70 has its side 74B also provided with a positive charge and its side 75B provided with a negative charge and since the large sections 72B of the plate 71B are disposed opposite the small sections 73A of the plate 71A as illustrated in FIG. 2, a non-uniform field 76 is created between each adjacent small section 73A and large section 72B of the plates 71A and 71B with the more intense portion thereof being adjacent the section 73A of the plate 71A as illustrated by the force lines in FIG. 2. Also, the small sections 73B of the plate 71B cooperate with the large sections 72A of the plate 71A to define the non-uniform fields 77 having the more intense portions thereof directed toward the plate 71B as illustrated in FIG. 2. Likewise, the plate 71C of FIG. 2 has its side 74C positively charged and its side 75C negatively charged so as to cooperate with the side 74A of the plate 71A to provide the alternately arranged non-uniform fields 78 and 79 respectively having the more intense portions thereof directed toward the plates 71A and 71C. If desired, the charge per square inch of the smaller sections 73 of each plate 71 can be larger, smaller or the same as the charge per square inch of the larger sections 72 of the same plate or the plate 71 that is to cooperate therewith. Also, each plate 71 could be encapsulated in insulating material, if desired.

A pair of separator plates 80 are disposed between each adjacent pair of electret plates 71 in the manner illustrated in FIG. 2 wherein the plates 80A and 80B are disposed between the electret plates 71A and 71B while the separator plates 80C and 80D are disposed between the electret plates 71C and 71A with the separator plates 80 being disposed closely adjacent electret plates 71 rather than towards its adjacent separator plate 80 in the manner illustrated in FIG. 2. Each separator plate 80 has a plurality of slots 81 passing therethrough with each slot 81 being so arranged that the same is located adjacent the more intense portion of a particular electrostatic field 76, 77, 78 or 79 in the manner illustrated in FIG. 2. In this manner, the particles, etc. attracted by the non-uniform fields 76–79 will respectively pass through the opening means 81 in the separator plates 80 as illustrated in FIG. 2.

The plates 71 and 80 are arranged in the stack 70 with substantially the spacing illustrated by suitable spacers (not shown) whereby the separator plates 80A and 80D define a vertical passage means 82 therebetween which receives the electret plate 71A while the separator plates 80C and 80D define a relatively wide vertical passage 83 therebetween. The separator plates 80A and 80B define a relatively wide passage means 84 therebetween. The electret plate 71C that is disposed between the separator plate 80C and another separator plate 80E is disposed in a relatively narrow vertical passage means 85 while the electret plate 71B is disposed within a relatively narrow vertical passage 86 defined between the separator plate 80B and another separator plate 80F. Thus, the stack 70 can be comprised of any number of a plurality of cooperating electret plates 71 and the separator plates 80 disposed therebetween in the module arrangement illustrated in FIG. 1 with such module arrangement repeating itself any number of times until the outside walls or end plates 87 and 88 are reached as illustrated in FIG. 2.

The left hand end plate 87 cooperates with an adjacent spacer 80G to define a narrow vertical passage 89 therebetween which receives a metallic plate 90 formed in the same manner as an electret plate 71 except that the same is externally charged by a charging device 91 in any suitable manner to have a charge thereon opposite to the charge on the facing side of the electret plate 71 that cooperates therewith to provide the non-uniform fields 76A and 77A illustrated in FIG. 2. Likewise, the end plate 88 cooperates with a separator plate 80H to define a narrow vertical passage 92 therebetween which receives a metallic electrode plate 93 formed in the same configuration as an electret plate 71 and is charged by the charging device 91 to have a charge thereon opposite to the charge on the facing side of the electret plate 71 that cooperates therewith to define the non-uniform fields 78A and 79A illustrated in FIG. 2. Of course, the plates 90 and 93 could be continuous throughout their length and still provide the non-uniform effect illustrated in connection with the electret plates 71C and 71B. Thus, the plates 90 and 93 could be the end conductive plates of a conventional electrodialysis stack.

In this manner, it can be seen that as a particle containing fluid flows vertically downwardly through the various vertical passages of the apparatus stack 70 illustrated in FIG. 2 and into the plane of the stack 70 as illustrated by the top cross-sectional view of FIG. 3, the adverse particles in the passage 83 are separated with the negative particles, as well as part of the neutral particles thereof moving through the openings 81 of the separator plate 80D into the vertical passage 82 while the adverse positive particles, as well as part of the neutral particles move through the openings 81 of the plate 80C into the vertical passage 85. Likewise, the adverse positive particles in the vertical passage 84 move through the openings 81 of the separator plate 80A into the vertical passage 82 to combine with the electronegative particles being drawn therein through the separator plate 80B so that neutralizing takes place on any charged particle separation influence on the charged particles in the passages 83 and 84. Obviously, the adverse negative particles in the passage 84 pass out through the openings 81 in the separator plate 80B into the vertical passage 86.

In this manner, as the fluid flows vertically downwardly in FIG. 2 the fluid in every other passage thereof has the adverse particles thereof removed out through exit means of the particular passage means to be received in passage means that contain the electret plates 71 so as to combine with oppositely charged and removed particles to provide a concentrated and neutral particle fluid flow in the passages that have the electret plates 71 whereas the fluid in the passages between the separator plates 80 gradually have the particles therein removed to provide substantially particle free fluid at the lower ends thereof.

By having the end electrode plates 90 and 93 oppositely charged, the same maintain the neutralizing effect at the outboard wide passages at the opposed ends of the stack 70 so that as the charged particles pass to the plates 90 and 93, the same gain or lose electrons as the case may be in the same manner provided at the end electrode plates of the aforementioned electrodialysis process. Also, the end plates 90 and 93 provide the field therebetween as in the conventional electrodialysis process for that conventional purpose in removing the particles, etc.

However, it is to be understood that the electrets and separator modules as illustrated in FIG. 1 could be so constructed and arranged that the same can be disposed in a circular array thereof so that no externally charged plates 90 and 93 need be provided therein as the circular array of passages would cooperate with each other in a manner that neutralization of the charged particle separation would be provided in the same manner that it is provided by the passages 85, 83, 82, 84 and 86 illustrated in FIG. 2 of the drawings. Also, it may be found that separator plates 80 need not be utilized as concentration and deconcentration may take place without charged particle diffusion being an adverse problem.

If it should be found that the vertical flow through the stack 70 creates too much turbulence at the openings 81 in the separator plates 80 so that charged particle diffusion takes place, the openings 81 in the separator plates 80 could be filled with charged particle selective or charged particle non-selective membranes in much the same manner as provided by the electrodialysis process so as to prevent charged particle migration once the charged particles have passed through the separator 80 by the aforementioned non-uniform fields. Alternately, the entire separator plate 80 could be a membrane sheet without any openings therein for the purpose of charged particle movement therethrough in the same manner as provided by the electrodialysis process. Thus, it may be found that the non-uniform field effects aid in causing the particles to move through the various known membranes at a faster rate than provided by the conventional electrodialysis process.

In any event, it can be seen that a more rapid separation would seem to take place at each wide passage, such as passage 83 or 84, of the stack 70 than would be the case when only the outboard electrode plates 90 and 93 are utilized in a stack as provided in the electrodialysis process because at each wide passage 83 or 84, etc. the non-uniform fields are being utilized to rapidly move the charged particles in opposite directions for departicling of the fluid in the passage having the non-uniform fields imposed across the same.

Instead of utilizing electret plates 71 to produce the opposite charge sides as provided by each electret plate 71, an electrode plate 100 of FIG. 27 could be utilized in place of each of the electret plates 71 inbetween the separator plates 80.

In particular, each electrode plate 100 comprises a pair of metal plates 101 and 102 each formed in the same configuration as an electret plate 71 and embedded in suitable insulating material 103 to define a plurality of large rectangular or square sections 104 thereof and a plurality of small narrow rectangular sections 105 in much the same manner as the sections 72 and 73 of the plate 71 except that the metal plates 101 and 102 are separated from each other by the insulating material 103 and are oppositely charged by suitable external charging means 106 whereby the side 107 of the electret plate 100 could attract positive particles toward the same while the opposite side 108 would attract negative particles toward the same since the plates 101 and 102 are respectively provided with a negative and a positive charge.

While each non-uniform field has been previously described as being created between a pair of electrodes of equal and opposite polarity, it is to be understood that the non-uniform fields might each be formed between a pair of electrodes of like polarity but of different intensity or be formed between a pair of electrodes one of which is at ground potential and the other of which is at a negative or positive potential.

It may also be found that the particles removed by the non-uniform fields could be liquid particles, gaseous particles, ions, etc. contained in the fluid being passed through the passage defining means.

It is believed that if the potential differential between the various electrodes of each embodiment that create the previously described non-uniform electrostatic fields is of such a strength and/or configuration, the same will create turbulence in the fluid passing through the respective apparatus by the phenomenon known as "electroconvection."

For example, see the article, "Electrohydrodynamics: A Review of the Role of Interfacial Shear Stresses," by Melcher et al., pages 111–146, of the Annual Review of Fluid Mechanics, Vol. 1, 1969, and the article, "Surface Electroconvection," by Malkus et al, pages 13–23, of the January, 1971, The Physics of Fluids, Vol. IV, No. 1, for the theories behind electroconvection.

Referring now to FIG. 2 of the drawings, it can be seen that if the electrostatic non-uniform fields 76, etc. are of sufficient strength, the same will cause turbulence in the fluid passing through the large passages 83, etc. and also in the smaller passages 82, etc. to thereby cause complete mixing of the fluids in the various passages thereof for any desired purposes. For example, the mixing of the fluid in the larger passages 83, etc. would prevent polarization at the membranes 80A, etc. whereas the mixing of the fluid in the passages 82, etc. will permit oppositely charged particles to readily neutralize each other in the channels 82, etc.

Therefore, if the arrangement 70 of FIG. 2 could be utilized for desalination purposes, the electroconvection currents being created by the alternately arranged non-uniform electrostatic fields would prevent polarization at the product-facing sides of the membranes 80A, etc. and would provide complete neutralization of the oppositely charged ions and particles on the brine-facing sides of the membranes 80A, etc.

Therefore, it can be seen that in each embodiment, moisture bearing material can pass through the alternately arranged non-uniform electrostatic fields to tend to have at least part of the moisture thereof moved relative to the material toward the outer layers thereof and maybe even be moved completely out of the material.

While the methods of this invention now preferred have been described and illustrated as required by the Patent Statute, it is to be understood that other method steps can be utilized and still come within the scope of the appended claims.

What is claimed is:

1. A method of treating moisture bearing material comprising the steps of creating a plurality of non-uniform electrostatic fields with each field having the higher intensity portion thereof substantially oppositely located relative to the higher intensity portion of an adjacent non-uniform field, and disposing said material so that said non-uniform fields at least partially extend across said material to act on at least part of the moisture thereof to move at least part of said moisture relative to said material.

2. A method as set forth in claim 1 and including the step of causing relative movement between said material and said fields.

3. A method as set forth in claim 1 wherein said step of creating said non-uniform electrostatic fields comprises the step of disposing a plurality of pairs of spaced apart electrodes with each pair of electrodes creating one of said non-uniform fields therebetween.

4. A method as set forth in claim 3 and including the step of electrically insulating said electrodes from said moisture of said moisture bearing material.

5. A method as set forth in claim 3 and including the step of forming said electrodes from electret means.

6. A method as set forth in claim 1 wherein said step of disposing said material comprises the step of supporting said material so that said non-uniform fields at least partially extend across said material.

7. A method as set forth in claim 3 wherein said step of disposing said material comprises the step of disposing said material so as to be out of contact with said electrodes while said non-uniform fields still at least partially extend across said material.

8. A method as set forth in claim 7 and including the step of causing relative movement between said material and said fields.

9. A method as set forth in claim 3 wherein said step of disposing said material comprises the step of disposing said material so as to be in contact with said electrodes while said non-uniform fields still at least partially extend across said material.

10. A method as set forth in claim 9 and including the step of causing simultaneous movement of said fields and said material.

* * * * *